US008851134B2

(12) United States Patent
Lin et al.

(10) Patent No.: US 8,851,134 B2
(45) Date of Patent: Oct. 7, 2014

(54) VACUUM DEVICE AND BONDING APPARATUS USING THE SAME

(75) Inventors: Dong-Sheng Lin, Tu-Cheng (TW); Tzyy-Chyi Tsai, Tu-Cheng (TW); Jian-Jun Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 158 days.

(21) Appl. No.: 12/567,907

(22) Filed: Sep. 28, 2009

(65) Prior Publication Data
US 2011/0021105 A1      Jan. 27, 2011

(30) Foreign Application Priority Data

Jul. 24, 2009   (CN) .......................... 2009 1 0304812

(51) Int. Cl.
*B29C 65/00*      (2006.01)
*B32B 37/00*      (2006.01)
(Continued)

(52) U.S. Cl.
CPC ............. *B32B 37/10* (2013.01); *B23B 2457/20* (2013.01); *G02F 1/1303* (2013.01); *B32B 37/1018* (2013.01); *B32B 37/0053* (2013.01)
USPC ........... 156/382; 156/285; 156/286; 264/511; 264/526; 264/553; 264/571; 425/504; 425/546; 425/388; 425/405.1; 425/405.2

(58) Field of Classification Search
USPC .......... 156/285, 286, 287, 382, 381; 425/504, 425/584, 388, 405.1–405.2, 85; 264/468, 264/46.8, 87, 511, 526, 553, 566, 568, 571, 264/101
See application file for complete search history.

(56) References Cited

U.S. PATENT DOCUMENTS 5,648,109 A  *   7/1997   Gutowski et al. ............. 425/504
6,331,754 B1 *  12/2001   Satoyoshi et al. ....... 315/111.51
(Continued)

FOREIGN PATENT DOCUMENTS

CN          1212380 A        3/1999
CN          1437044 A        8/2003
(Continued)

*Primary Examiner* — Richard Crispino
*Assistant Examiner* — Matthew Hoover
(74) *Attorney, Agent, or Firm* — Novak Druce Connolly Bove + Quigg LLP (57) ABSTRACT

A vacuum device includes a main body and an adjustment assembly connected to the main body. The main body includes a frame, a loading member, and an elastic film. The loading member and the elastic film are arranged at opposite end surfaces of the frame. A chamber is cooperatively formed by the frame, the loading member, and the elastic film. The adjustment assembly adjusts the inner air pressure of the chamber. The loading member includes an absorption area connecting the chamber to outside the main body. The absorption area changes the air pressure inside the chamber. Also provided is a bonding apparatus using the vacuum device.

10 Claims, 7 Drawing Sheets

(51) Int. Cl.

| | | |
|---|---|---|
| *B29C 45/00* | (2006.01) | |
| *B29C 47/00* | (2006.01) | |
| *B29C 39/02* | (2006.01) | |
| *B29C 43/02* | (2006.01) | |
| *B29C 49/00* | (2006.01) | |
| *B29C 49/08* | (2006.01) | |
| *B29C 67/00* | (2006.01) | |
| *B29D 22/00* | (2006.01) | |
| *B29C 51/00* | (2006.01) | |
| *B29D 24/00* | (2006.01) | |
| *B29D 29/00* | (2006.01) | |
| *B29C 43/10* | (2006.01) | |
| *B28B 21/36* | (2006.01) | |
| *A01J 21/00* | (2006.01) | |
| *A01J 25/12* | (2006.01) | |
| *A23P 1/00* | (2006.01) | |
| *B29B 11/06* | (2006.01) | |
| *B29C 35/00* | (2006.01) | |
| *A21C 3/00* | (2006.01) | |
| *A21C 11/00* | (2006.01) | |
| *A23G 1/20* | (2006.01) | |
| *B28B 11/08* | (2006.01) | |
| *B29C 55/28* | (2006.01) | |
| *B32B 37/10* | (2006.01) | |
| *G02F 1/13* | (2006.01) | |

(56) References Cited

U.S. PATENT DOCUMENTS

| | | | |
|---|---|---|---|
| 2001/0000611 A1* | 5/2001 | Cline et al. | 222/1 |
| 2003/0019739 A1* | 1/2003 | Shibamoto et al. | 204/192.2 |
| 2003/0145943 A1* | 8/2003 | Lee et al. | 156/285 |
| 2008/0314497 A1* | 12/2008 | Pettersen et al. | 156/62.2 |

FOREIGN PATENT DOCUMENTS

| | | | |
|---|---|---|---|
| CN | 2657044 Y | 11/2004 | |
| GB | 2438704 A | * 12/2007 | B29D 30/24 |
| JP | 54-103472 A | 8/1979 | |
| JP | 57-8158 A | 1/1982 | |
| JP | 62-73921 U | 4/1987 | |
| JP | 11-320682 A | 11/1999 | |

* cited by examiner

VACUUM DEVICE AND BONDING APPARATUS USING THE SAME

BACKGROUND

1. Technical Field

The present disclosure generally relates to panel fabrication and, more particularly, to a bonding apparatus using a vacuum device used in display panel fabrication.

2. Description of Related Art

During fabrication of a liquid crystal display panel, a flexible film or an optical cement is attached to a substrate to protect the substrate or facilitate attachment of another substrate thereto. The process is often achieved by employing a film bonding apparatus.

A typical film bonding apparatus includes a base body and an adjustment device. The base body defines a plurality of holes enveloped by an elastic film. These holes communicate with each other and form a cavity on the inside of the base body. The adjustment device includes a gas pipe extending into the interior of the base body from the side surface of the base body. A viscous film is bonded on the elastic film, aligning and bonding with the substrate. The adjustment device fills gas into the base body, inflating the elastic film and pressing the viscous film to bond firmly with the substrate. The adjustment device bleeds the gas from the base body, whereby the elastic film is restored and separates from the viscous film.

There is minor force between the viscous film and the elastic film to ensure separation of the two from each other after the viscous film bonds with the substrate. The viscous film is easily dislodged from the bonding apparatus. In addition, both sides of the viscous film require low viscosity, limiting the ease of using the bonding apparatus.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
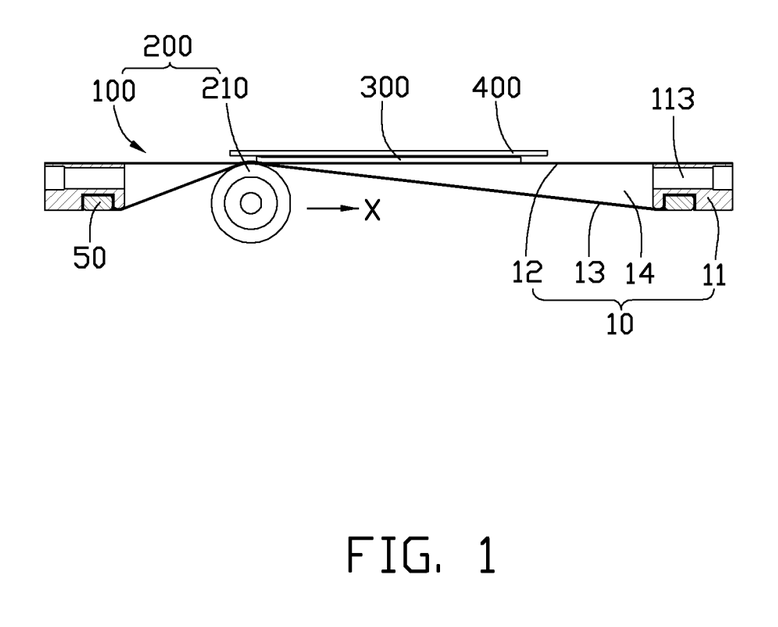
FIG. 1 is an assembled, isometric view of one embodiment of a bonding apparatus in an operational state, including one embodiment of a vacuum device and a rolling member.

FIG. 1 is an assembled, isometric view of a bonding apparatus 200 for bonding a protective film 300 to a substrate 400 in an operational state, including a vacuum device 100 and a rolling member 210. In the illustrated embodiment, the protective film 300 is an optical adhesive.

Figure 2:
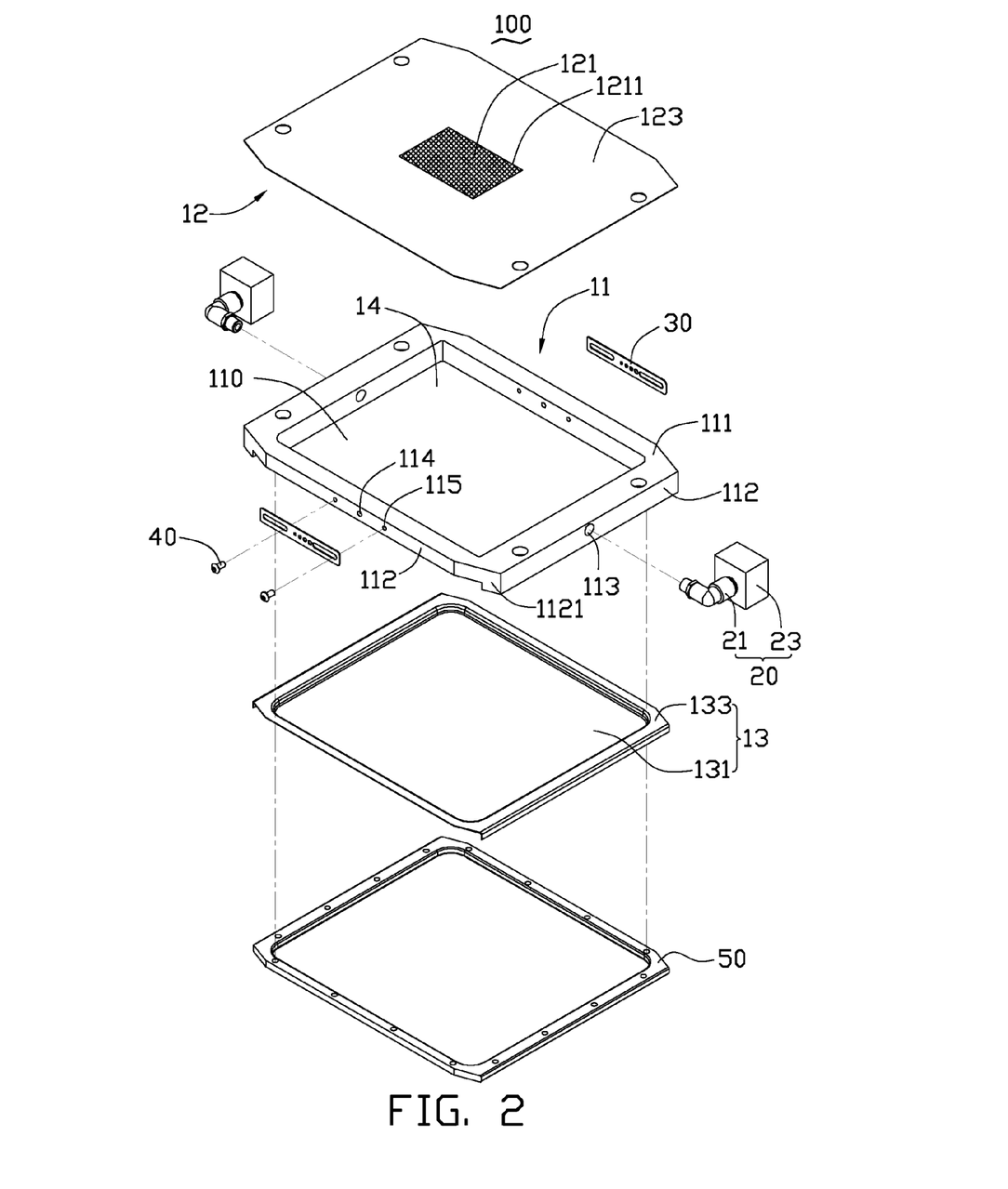
FIG. 2 is an exploded, isometric view of a vacuum device utilized in a bonding apparatus, such as, for example, that of FIG. 1.

Referring to FIGS. 1 and 2, the vacuum device 100 includes a main body 10, two adjustment assemblies 20 connected to the main body 10, two regulating members 30 fixed to the main body 10, and a plurality of fasteners 40 such as, for example, screws.

The main body 10 includes a frame 11, a loading member 12, and an elastic film 13. A chamber 14 is cooperatively formed by the frame 11, the loading member 12, and the elastic film 13.

The frame 11 has two opposite end surfaces 111 and four side surfaces 112 between the two opposite end surfaces 111. The frame 11 further defines an opening 110 thereon cutting through the two opposite end surfaces 111. The loading member 12 and the elastic film 13 are arranged at the two opposite end surfaces of the frame 11. The loading member 12 covers an end of the opening 110 of the frame 11, the elastic film 13 covers an another end of the opening 110 of the frame 11 opposite to the loading member 12. Each two adjacent side surfaces 112 are connected with each other by a connecting surface 1121. Two connecting holes 113 and two gas holes 114 are defined on the frame 11 from the side surface 112. The connecting holes 113 are opposite to each other, and the gas holes 114 are opposite to each other. Two threaded holes 115 are defined at two sides of each gas hole 114.

Figure 3:
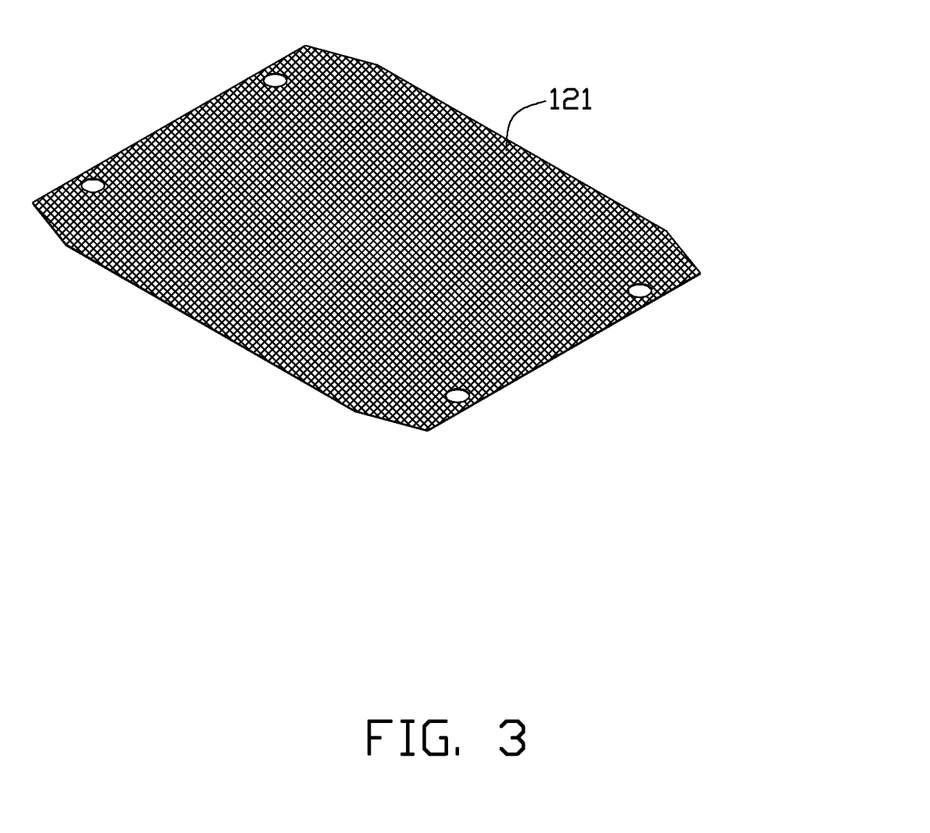
FIG. 3 is an assembled, isometric view of a screen in FIG. 2.
Figure 4:
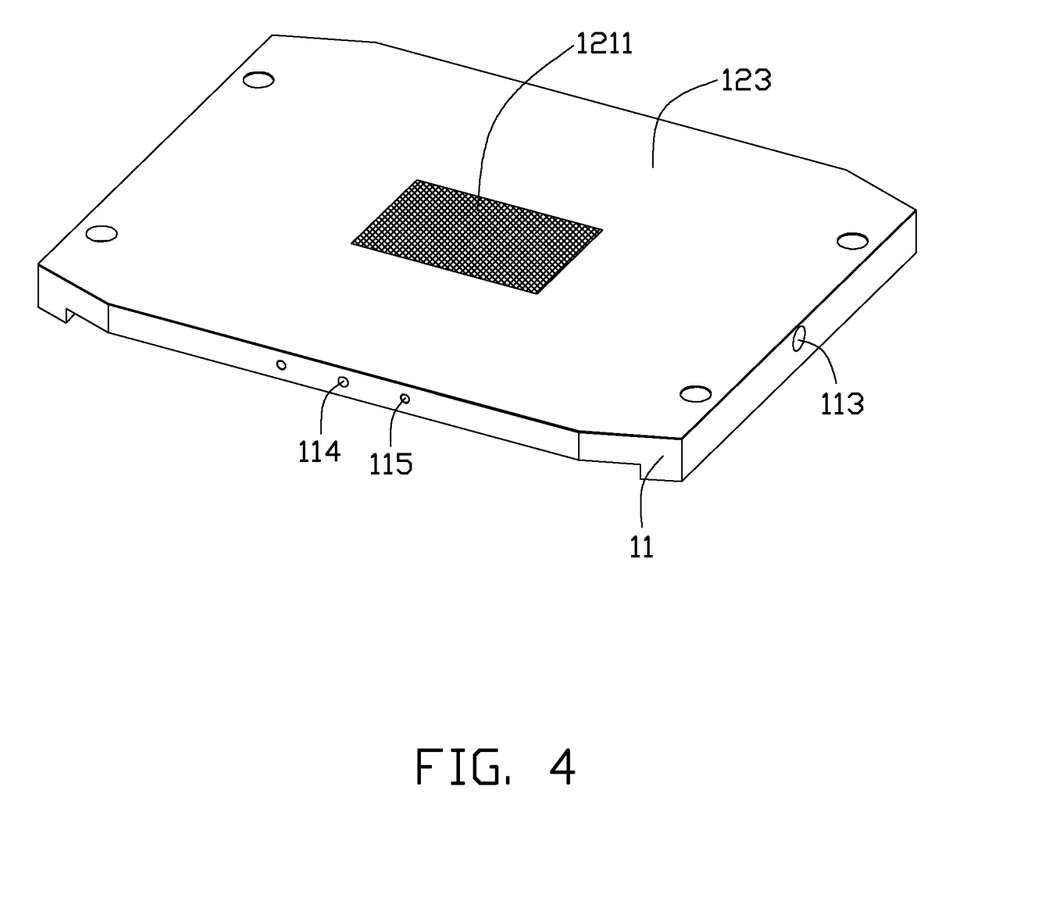
FIG. 4 is an assembled, isometric view of a loading member and a frame in FIG. 2.

Referring to FIGS. 2 through 4, the loading member 12 includes a ventilation screen 121 and a fluid sealant 123 coated on parts of the screen 121. Parts of the screen 121 not coated in fluid sealant 123 form an absorption area 1211. The edge of the loading member 12 tightly connects with one end surface 111 of the frame 11. Before the fluid sealant 123 is coated on the screen 121, all parts of the loading member 12 allow ventilation. After coating the fluid sealant 123, only the absorption area 1211 allows ventilation. The loading member 12 communicates with the exterior of the chamber 14 by the ventilative absorption area 1211.

The elastic film 13 includes a base body 131 and a connecting portion 133 arranged at the edge of the base body 131. The elastic film 13 tightly connects with another end surface 111 of the frame 11, whereby the chamber 14 is formed. The elastic film 13 is rubber or other elastic material that provides sealing capability.

Each adjustment assembly 20 includes a joint 21 connecting with the frame 11 and an permeable member 23 for changing the pressure of the chamber 14 of the main body 10. The joint 21 communicates with the chamber 14 of the main body 10 via the connecting hole 113 of the frame 11.

Figure 5:
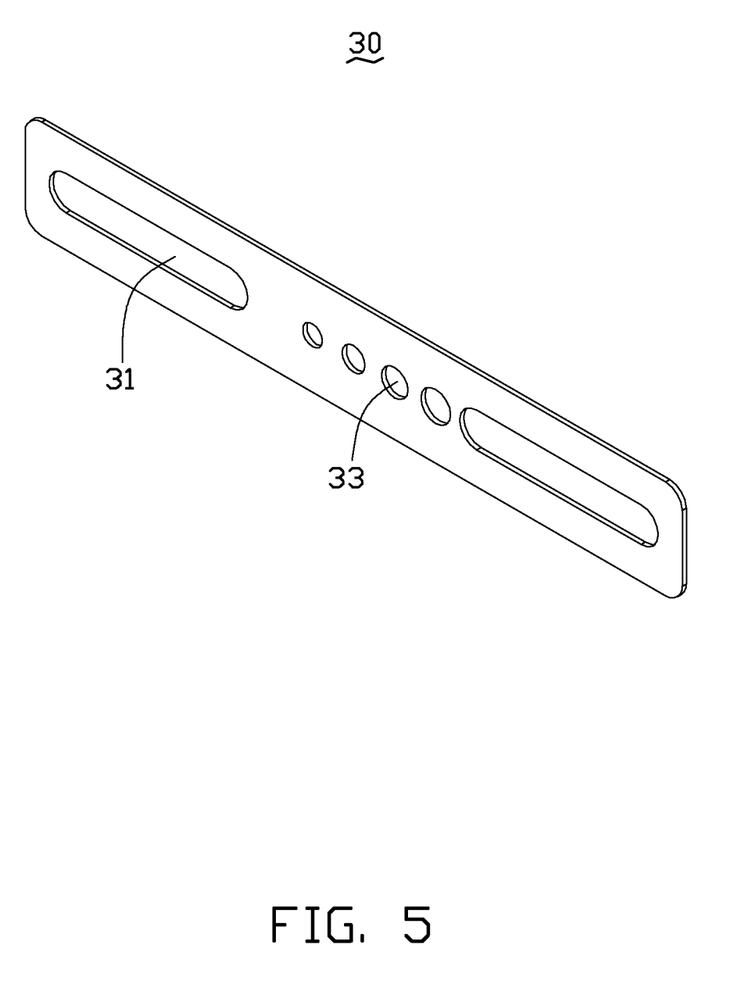
FIG. 5 is an assembled, isometric view of a regulating member in FIG. 2.

Referring to FIGS. 2 and 5, the regulating member 30 defines two locking slots 31 and four through holes 33 between the two locking slots 31. The regulating member 30 connects with the frame 11 by fasteners 40 extending from the locking slot 31 into the threaded holes 115 of the frame 11. The four holes 33 have different diameters, one of each being substantially the same as that of the gas hole 114 of the frame 11, and the others smaller than the diameter of the gas hole 114 of the frame 11. The cross-section of the diameter of the fastener 40 is substantially the same as the width of the locking slot 31 but less than the length of the locking slot 31, so that the regulating member 30 can be retained by the fastener 40 in different positions within the locking slot 31. Accordingly, the gas hole 114 of the frame 11 can communicate with different through holes 33 of the regulating member 30 by movement of the regulating member 30.

In addition, the vacuum device 100 also includes a fixing bracket 50 for fixing the elastic film 13, which snugly connects with frame 11 by the fixing bracket 50.

Referring to FIG. 1, the rolling member 210 is arranged at one side of the elastic film 13 of the vacuum device 100, and can move relative to the elastic film 13 to press the base body 131 of the elastic film 13 to contact the loading member 12.

Figure 6:
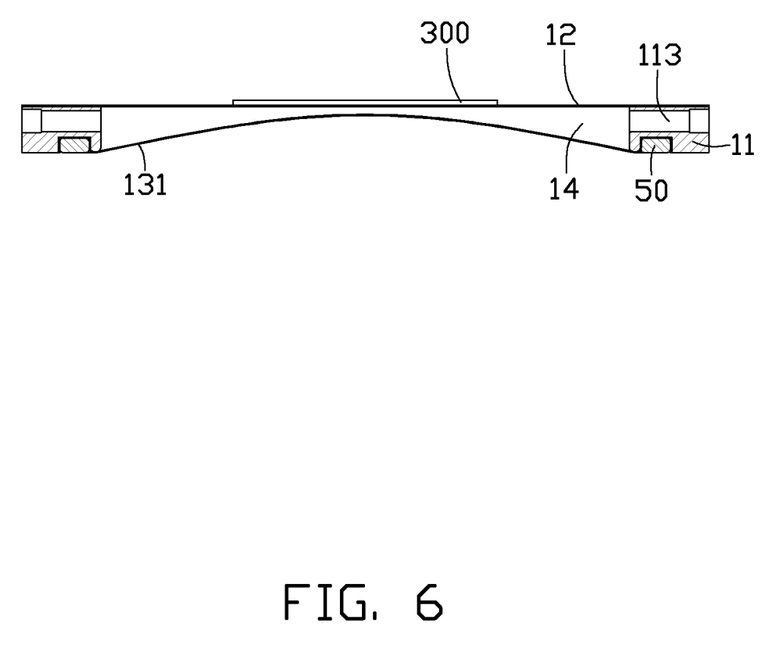
FIG. 6 shows the vacuum device in FIG. 2 at negative pressure.
Figure 7:
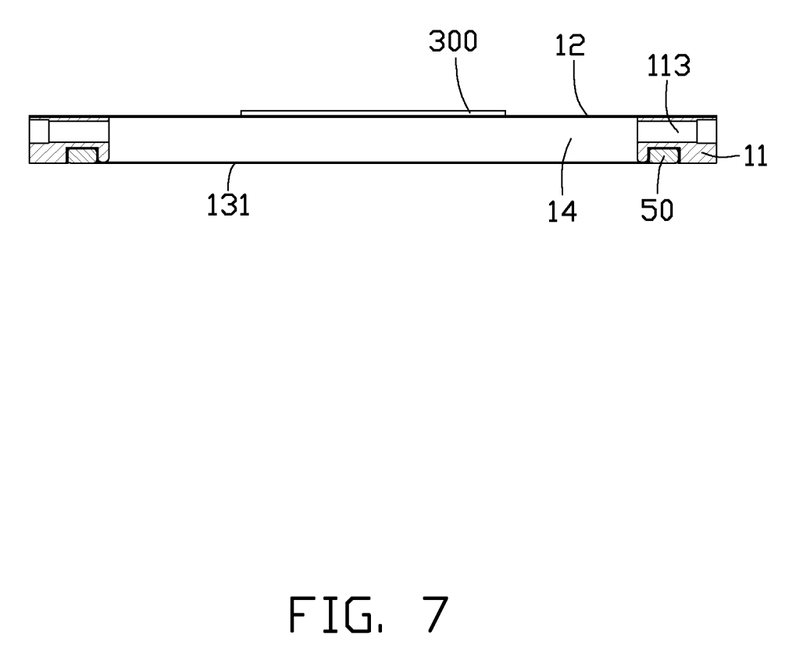
FIG. 7 shows the vacuum device in FIG. 2 at normal pressure.

Referring to FIGS. 1 and 2, during use of the bonding apparatus 200, a protective film 300 is arranged on the loading member 12, and encloses the absorption area 1211 of the loading member 12 completely. The adjustment assembly 20 bleeds air from the chamber 14 of the vacuum device 100, so that the pressure inside the chamber 14 is less than that of the exterior, thereby causing the elastic film 13 to deform (shown in FIG. 6). Force created at the absorption area 1211 attracts the protective film 300 snugly. The gas holes 114 of the frame 11 communicate with the outside of the chamber 14 via the through holes 33 of the regulating member 30. When a smaller through hole 33 communicates with the gas hole 114 of the frame, parts of the gas hole 114 are enclosed, so that the air pressure inside the chamber 14 can still be adjusted slightly by different through holes 33 of the regulating member 30 communicating with the gas hole 114 of the frame 11. The gas holes 114 of the frame 11 may be enclosed completely by the portion of the regulating member 30 not defining a through hole 33. A substrate 400 is delivered above and contacting the protective film 300. The substrate 400 is held or pressed in place by other members. The rolling member 210 moves relative to the elastic film 13, and presses the base body 131 of the elastic film 13 to contact the loading member 12, and rolls along the direction X (shown in FIG. 1) to snugly bond the protective film 300 with the substrate 400. The rolling member 210 moves and separates from the base body 131 of the elastic film 13. The adjustment device 20 permits air into the chamber 14 to return the pressure to normal, normal being the same pressure as the ambient environment, and the base body 131 of the elastic film 13 returns to an unaffected state (shown in FIG. 7).

The vacuum device fixes a protective film by vacuum absorption, so that the protective film is snugly fixed by the absorption area even without viscosity, so viscosity at both sides of the protective film is not required. Therefore, the vacuum device can be widely utilized.

The rolling member is arranged outside of the chamber, simplifying the structure of the vacuum device. In addition, the rolling member ensures snug bonding between the protective film and the substrate.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A vacuum device, comprising:
   a main body comprising:
      a frame having a first end surface, a second end surface opposite to the first end surface and four side surfaces between the first and second end surfaces, the frame defining an opening thereon cutting through the first end surface and the second end surface;
      a loading member fixed on the first end surface of the frame and covering an end of the opening of the frame, the loading member comprising a screen with fluid sealant coated on parts thereof, parts of the screen not coated in the fluid sealant forming an absorption area, and
      an elastic film fixed on the second end surface of the frame and positioned opposite to the loading member; the elastic film covering an another end of the opening of the frame opposite to the loading member, such that, the elastic film, the frame and the loading member cooperatively defining a chamber, the elastic film being pressed to contact the loading member, thereby bonding a protective film with a substrate arranged on the loading member;
   two adjustment assemblies oppositely connected to two sides of the frame of the main body for adjusting air pressure inside the chamber, and
   two regulating members oppositely assembled to the other two sides of the main body for changing the air pressure inside the chamber;
   wherein the loading member defines an absorption area communicating the chamber and the exterior of the main body, the absorption area faces outside of the chamber.

2. The vacuum device of claim 1 further comprising a fixing bracket connecting with the frame, wherein the elastic film is fixed on the fixing bracket.

3. The vacuum device of claim 1, wherein the edge of the loading member tightly connects with one end surface of the frame.

4. The vacuum device of claim 1, wherein the frame further comprises two connecting holes oppositely defined through two side surfaces of the frame, and communicating with the chamber of the main body; the two adjustment assemblies communicates with the chamber via the two connecting holes of the frame for adjusting air pressure inside the chamber.

5. The vacuum device of claim 4, wherein the frame further comprises two gas holes oppositely defined through the other two side surfaces of the frame; and communicating with the chamber of the main body; the two regulating members adjustably assembled to the other two opposite side surfaces of the frame for changing the width of the gas hole of the frame.

6. The vacuum device of claim 5, further comprising a plurality of fasteners; each regulating member defines at least one locking slot; the frame further defines a plurality of threaded holes corresponding to the plurality of fasteners, the two regulating members are assembled to the frame by the fasteners extending from the corresponding locking slots into the threaded holes of the frame.

7. The vacuum device of claim 6, wherein the regulating member defines a plurality of through holes with different diameters; the gas hole of the frame communicates with different through holes of the regulating member by movement of the regulating member.

8. The vacuum device of claim 7, wherein the cross-section of the diameter of the fastener is substantially the same as the width of the locking slot but less than the length of the locking slot, so that the regulating member is capable of being retained by the fastener in different positions within the locking slot.

9. The vacuum device of claim 4, wherein each adjustment assembly comprises a joint connecting with the frame and a permeable member for changing the pressure of the chamber of the main body, and the joint communicates with the chamber of the main body via the connecting hole of the frame.

10. The vacuum device of claim 3, wherein the protective film is snugly fixed by the absorption area even without viscosity, so that viscosity or viscous film at both sides of the protective film is not required.

* * * * *